United States Patent [19]
Lin et al.

[11] Patent Number: 6,088,721
[45] Date of Patent: Jul. 11, 2000

[54] EFFICIENT UNIFIED REPLICATION AND CACHING PROTOCOL

[75] Inventors: Chueng-Hsien Lin, Piscataway; Sanjoy Paul, Marlboro; Krishan K. Sabnani, Westfield, all of N.J.

[73] Assignee: Lucent Technologies, Inc., Murray Hill, N.J.

[21] Appl. No.: 09/175,188

[22] Filed: Oct. 20, 1998

[51] Int. Cl.[7] .................................................. G06F 15/167
[52] U.S. Cl. ............................... 709/214; 709/213; 714/4
[58] Field of Search .................................... 709/217, 218, 709/219, 203, 213, 248, 230, 214, 206; 714/4, 6, 14, 15; 707/201, 202, 204

[56] References Cited

U.S. PATENT DOCUMENTS

| | | | |
|---|---|---|---|
| 5,513,314 | 4/1996 | Kandasamy et al. ........................ | 714/6 |
| 5,596,720 | 1/1997 | Hamada et al. ......................... | 709/206 |
| 5,781,716 | 7/1998 | Hemphill et al. ............................ | 714/4 |
| 5,812,748 | 9/1998 | Ohran et al. ................................ | 714/4 |
| 5,819,020 | 10/1998 | Beeler, Jr. ............................ | 707/204 X |
| 5,974,563 | 10/1999 | Beeler, Jr. ............................ | 707/204 X |
| 6,018,805 | 1/2000 | Ma et al. ............................. | 709/230 X |

FOREIGN PATENT DOCUMENTS

95/03580  2/1995  WIPO .

OTHER PUBLICATIONS

Duane Wessels, Intelligent Caching for World Wide Web Objects, www.isoc.org, May 1995, 15 pages.

Pei Cao et al., Maintaining Strong Cache Consistency in the World Wide Web, IEEE Transactions on Computers, vol. 47, No. 4, Apr. 1998, pp. 445–457.

*Primary Examiner*—Zarni Maung
*Assistant Examiner*—Patrice Winder
*Attorney, Agent, or Firm*—Baker & McKenzie

[57] ABSTRACT

A protocol that provides assurance of consistent replication of objects from a server to caching servers, for example, over data communication networks such as the Internet. It is an application-layer protocol which guarantees delivery of objects such as files. This protocol insures that objects sent by a source machine such as a server to any number of destination machines such as caching servers actually arrive at the intended caching servers even when the caching servers are temporarily unavailable, for example, due to failure or network partition.

17 Claims, 4 Drawing Sheets

EFFICIENT UNIFIED REPLICATION AND CACHING PROTOCOL

FIELD OF THE INVENTION

The present invention relates to the replication and caching of objects close to an end-user, in particular to a protocol for providing assurance of successful object transmissions/reception over data communication networks such as the Internet.

BACKGROUND INFORMATION

Bandwidth and storage are important factors in the transmission and use of information in a network. If there is adequate bandwidth between a client and a server, the client can retrieve any information from the server in real-time. For example, a client can watch a video such as a 2 hour long MPEG coded VCR-quality video (1.5 Mbps) stored on a server in the network in real-time without requiring any storage or worrying about congestion, provided a bandwidth of 1.5 Mbps is available on a continuous basis. The problem becomes more complex, however, if there is no guarantee of the availability of the required bandwidth. In addition, congestion in the network can cause the available bandwidth to be significantly lower than the sustained bandwidth required for playing the video. One way of avoiding the bandwidth problem is by downloading the entire video at the client and playing the video locally.

Two ways of dealing with network traffic when a fast response time is desired such as streaming media in real-time are either to have plenty of bandwidth or to have plenty of storage, or both. In practicality, neither approach is feasible. First, bandwidth presently cannot be guaranteed in communication networks such as the Internet (without QOS support). Second, downloading an entire video may require an enormous amount of storage which the client may not have available. For example, the 2-hour MPEG video requires a storage of 1.35 gigabytes. Thus, a practical solution is to trade-off some storage for bandwidth.

Although the concept of duality between storage and bandwidth is present in a real-time streaming example, it holds true for any kind of traffic when fast response time is required. For example, when browsing the World Wide Web (WWW), when a client clicks on a button and tries to retrieve an object, it may take a long time to retrieve the object if the object size is large and the available bandwidth is small. However, if the object is stored close to the end-user, the end-user can retrieve it in a significantly shorter period of time.

To attain the objective of faster response time, selected objects from a server need to be replicated in caching servers close to the end-user. Then the end-user can retrieve the objects from the nearby caching servers rather than from the original server. There must be, however, consistent and reliable replication of objects. There is therefore a need for a protocol which provides consistent replication of objects in caching servers.

SUMMARY OF THE INVENTION

An objective of the present invention is to provide replication and caching of objects close to an end-user.

Another objective of the present invention is to provide a protocol for providing assurance of object delivery from a server to a caching server over data communication networks such as the Internet.

It is still another object of the present invention to provide object-level consistency between a server and caching servers.

An aspect of the present invention provides a method including setting a sequence number to a first initialization value, entering a server wait state, selecting a file and attaching a header (which contains a timestamp) to the file, determining to which of a plurality of caching servers to transmit the file, transmitting the file to each of the previously determined plurality of caching servers, and determining whether a file retransmission request by a caching server has been received. The file retransmission request includes an identification of the caching server and the last timestamp. The last timestamp includes a timestamp of the last file which has been successfully received by the caching server. Note that the timestamp of a file is assigned by the server in accordance with its own clock. When the server receives a file retransmission request, it retransmits those files to the requesting caching server which have timestamps greater than the last timestamp contained in the retransmission request Further, if the file retransmission request has not been received, a determination is made as to whether more files need to be transmitted to any of the plurality of caching servers. If no more files need to be transmitted, the sequence number is changed, and the server enters the server wait state. If more files need to be transmitted, the sequence number is changed and the server will go to the selecting file step.

Another aspect of the present invention provides setting an expected sequence number at a caching server to an expected sequence number initialization value, entering a first caching server wait state, and receiving at least one of a file or a server crash message from a server. The server crash message includes a timestamp. The file includes a header having a filename, a timestamp and a sequence number. The method also includes determining if the server has crashed based on at least one of the sequence number of the file or the server crash message. If the server has crashed, a last timestamp at the caching server (contained in the server crash message or in the file header from the server) is set to the timestamp, the expected sequence number is set to the initialization value, and the caching server enters the first caching server wait state. This is detected when a heartbeat message from the server is not received within a timeout period and later a file is received with a sequence not equal to the second initialization value. Further, the method includes that if the file was successfully received, storing the file and the filename in the caching server, setting the last timestamp to the timestamp, changing the expected sequence number, and entering the first caching server wait state. The method also includes that if the file was not successfully transmitted, determining if the file was transmitted by the server and not received by the caching server. The method also includes that if the file was transmitted by the server and not received by the caching server, sending a file retransmission request to the server and entering the first caching server wait state. The file retransmission request includes an identification of the caching server and the last timestamp. The last timestamp includes a timestamp of the last file which has been successfully received by the caching server. Otherwise, the expected sequence number is set to the sequence number, the file retransmission request is sent to the server, the last timestamp is set to the timestamp, and the caching server enters the first caching server wait state.

Yet another aspect of the present invention provides a method for obtaining object-level consistency of objects between a server and at least one caching server. The method includes tracking by the server of when each of the objects is modified last and associating a last modified field with each one of a plurality of objects. The last modified field includes a timestamp based on the tracking indicating when the respective object was modified last. The method also includes maintaining a data structure by the server relating the at least one caching server and the objects delivered to the at least one caching server, maintaining by the at least one caching server the server's most recent timestamp corresponding to the objects the at least one caching server received from the server, sending the most recent timestamp by the at least one caching server to the server when the at least one caching server becomes available, and comparing the last modified field for each of the objects with the most recent timestamp by consulting the data structure. Further, the method includes, for each of the objects, if the last modified field is greater than the most recent timestamp, delivering the respective object to the at least one caching server.

DETAILED DESCRIPTION

Figure 1:
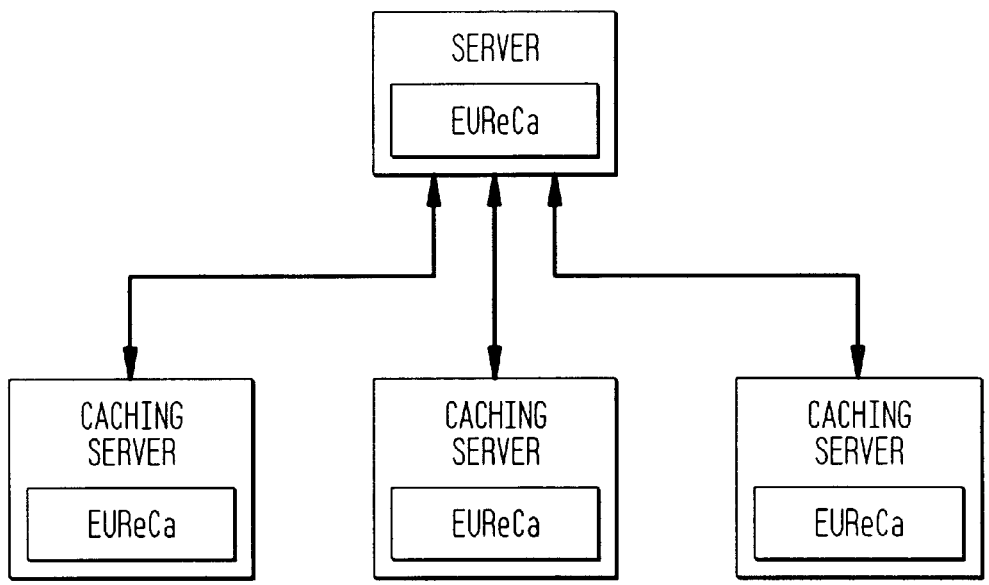
FIG. 1 shows an exemplary embodiment of the present invention including communication between a server and a plurality of caching servers operating in accordance with the present invention.
Figure 2:
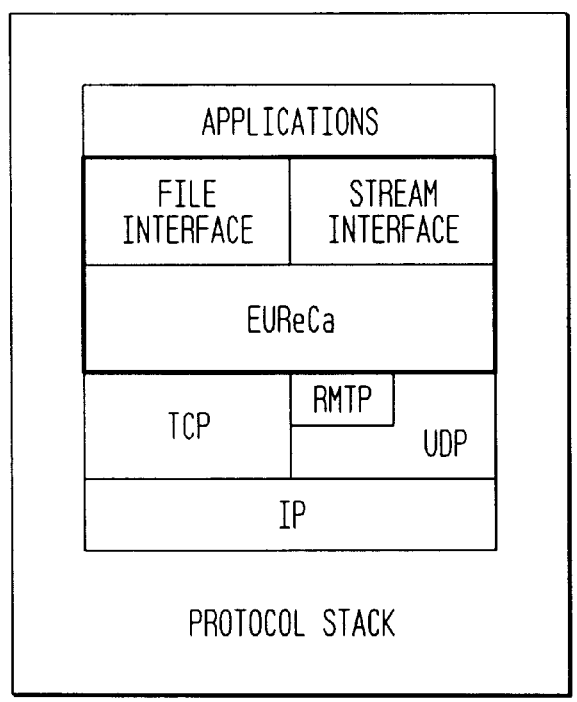
FIG. 2 shows a layer diagram of an exemplary embodiment of the present invention.

In an exemplary embodiment, the present invention provides an efficient unified replication and caching protocol (EUReCa). EUReCa is a protocol that provides assurance of consistent replication of objects from a server to caching servers, for example, over data communication networks such as the Internet. It is an application-layer protocol which guarantees delivery of objects such as files. This protocol insures that objects sent by a source machine such as a server to any number of destination machines such as caching servers actually arrive at the intended caching servers even when the caching servers are temporarily unavailable, for example, due to failure or network partition or because they crashed. EUReCa provides efficient mechanisms for selective replication and caching of objects, such as web contents, close to a user. In an exemplary embodiment of the present invention as shown in FIG. 2, EUReCa may be a key middleware component residing on top of a transport-layer protocol such as Transmission Control Protocol (TCP), User Data Protocol (UDP) and Reliable Multicast Transport Protocol (RMTP), all of which reside on top of the Internet Protocol (IP). EUReCa may be implemented, for example, on the server and caching servers from which users are expected to retrieve objects as shown in FIG. 1. In one embodiment, for example, EUReCa may be implemented directly on real servers and caching servers of the server vendors or on the servers and caching servers provided by a third party while interfacing with the real servers through an Application Programmers' Interface (API).

By providing information to points close to clients, both source overload and network overload are avoided. The objects may be transmitted over the Internet or over other communication channels. In an exemplary embodiment of the present invention, an association is established between a client and a caching server, and the caching server informs the network that it should be included among the destinations to which information, such as objects from the server, is transmitted. When information is subsequently transmitted by the server and received by the caching server, it is stored in the caching server in preparation for its being accessed by the clients.

Typically, such a caching server is located in the vicinity of the client which, in the context of this disclosure, means a location to which the client can connect with minimal burden on the communications network. A vicinity would correspond to a small number of nodes between the client and the caching server. In an exemplary embodiment of the present invention, bandwidth may be taken into account. Thus, a caching server that is two nodes away with very high bandwidth links might be selected over a caching server that is one node away but which has a relatively narrow bandwidth link.

In an exemplary embodiment of the present invention, the server determines which files are to be transmitted to which caching server and multicasts or broadcasts the respective files to the respective caching servers. For example, the files to be transmitted to respective caching servers can be determined by the subscription obligations of the associated clients. In another exemplary embodiment of the present invention, all files can be sent to all caching servers. When clients desire information, they access it from the respective caching servers. In an exemplary embodiment of the present invention, every time an updated file is generated, it is transmitted to the respective caching servers and replaces the old file. When a file is discarded from a server, a message is sent to the respective caching servers to discard the corresponding file. In connection with files created by others and adopted, so to speak, by the server, in an exemplary embodiment of the present invention the server checks the source of the files with some selected regularity and updates the caching servers appropriately.

EUReCa can be either sender-driven (EUReCa-S) or receiver-driven (EUReCa-R). In EUReCa-S, for example, the server explicitly keeps track of the status of every caching server through an active receiver list (ARL). That is, the server knows the identity of the caching servers that are supposed to receive a transmitted object, and waits for each caching server to acknowledge every received object before proceeding with the transmission of a next object. A caching server can send an acknowledgment for every object it receives, a cumulative acknowledgment for a set of objects, or an acknowledgment for a "portion" of an object. The last type of acknowledgment is useful when the object is a very large file, for example, a video movie of several gigabytes. When the server does not receive an acknowledgment from a caching server within a pre-determined time, it flags the caching server's entry in the ARL as unavailable, and keeps track of objects that should have been received, but were not. This may be done, for example, by noting the time when the receiver became unavailable.

Recovery is effected, illustratively, by polling the unavailable caching servers at regular intervals. Once a caching server becomes active and affirmatively responds to the polling signal, the server retransmits all of the files that have been missed by the now-available caching server. To minimize the down time of a caching server that was unavailable and then becomes available, the EUReCa protocol permits such a caching server to send a message that informs the server that it is now available to receive objects.

In EUReCa-R, for example, the server does not explicitly keep track of the status of the caching servers. Rather, it transmits objects with a timestamp and a sequence number, and leaves the responsibility of reliable delivery to the caching server. It also sends a heartbeat message on a periodic basis. A caching server detects that something is wrong when it misses more than a predetermined number of the heartbeat messages, detects a missing object because the sequence is off, does not receive an object completely, or becomes available after being unavailable for some time. When the caching server misses an object, it requests a retransmission of the missed object based on the missing object's sequence number. When the caching server has been unavailable for a while and then becomes available, it provides the server with the last timestamp and the size of a file that it received from the server in case it only partially received an object. Based on this timestamp, the sender retransmits the objects(s) and/or portions of an object that need(s) to be retransmitted.

In an exemplary embodiment of the present invention, EUReCa offers object-level guaranteed delivery and object-level consistency. EUReCa provides object-level guaranteed delivery, for example, by using a protocol such as RMTP for reliably distributing objects from a server to the caching servers. On top of that, a connection manager keeps track of which caching servers have and have not received a given object. In an exemplary embodiment of the present invention, EUReCa provides three levels of reliable delivery including basic reliability, strong reliability, and guaranteed reliability.

In the basic reliability level, for example, if a caching server was not available during the transfer, objects may not be successfully delivered. The application, however, will be informed about the failure. In the strong reliability level, for example, EUReCa attempts to deliver an object such as a file to a caching server up to a pre-specified number of times. If the delivery is still unsuccessful, the application is notified. In the guaranteed reliability level, for example, EUReCa makes sure that an object such as a file is delivered to a caching server under all conditions. That is, if a caching server crashed or was not available during the transfer, EUReCa will guarantee delivery when the machine comes up or becomes available.

Several situations exist in which objects get modified in the servers. For example, caching servers can go down and come back up, and networks can get partitioned and the partition can heal. These conditions can lead to inconsistent objects in the caching servers. For example, consider an object X.υ.n. where υ.n. represents version n of object X. If a caching server C is down/unavailable when X.υ.n is distributed, C will have X.υ(n-1) while all the other caching servers will have X.υ.n. There may be more version changes of the same object before C comes up. EUReCa provides object-level consistency by detecting and fixing inconsistences. EUReCa requires that information be maintained to attain object-level consistency. In an exemplary embodiment of the present invention, the information includes a server keeping track of when each object is modified last and also includes the last modified field L with each object which includes the timestamp when the respective object was modified last; the server maintaining a data structure D relating caching servers and objects delivered to each caching server; and each caching server maintaining the server's most recent timestamp TS corresponding to objects it received from a server.

EUReCa's consistency sub-protocol sends the most recent timestamp TS to the server when a caching server C comes up or becomes available. The server consults data structure D which relates the list of objects pertaining to C and compares the last modified field L for each object. If L>TS, the object is delivered to C.

The caching server only has to maintain the most recent timestamp of an object received from the server. Also, the protocol for ensuring consistency is simple in the sense that the server needs to do a comparison of TS against L (last modified field) of each object relevant to C and deliver those objects to C for which L exceeds TS.

EUReCa provides interfaces for both objects and streams. For example, in an exemplary embodiment of the present invention, the interface can be a server providing a list of objects and a list of caching servers to EUReCa with EUReCa doing the replication of the objects on the relevant caching servers. In an exemplary embodiment of the present invention, the interface can provide access patterns for various objects so that EUReCa can determine which objects need to be replicated in which caching servers.

Figure 3:
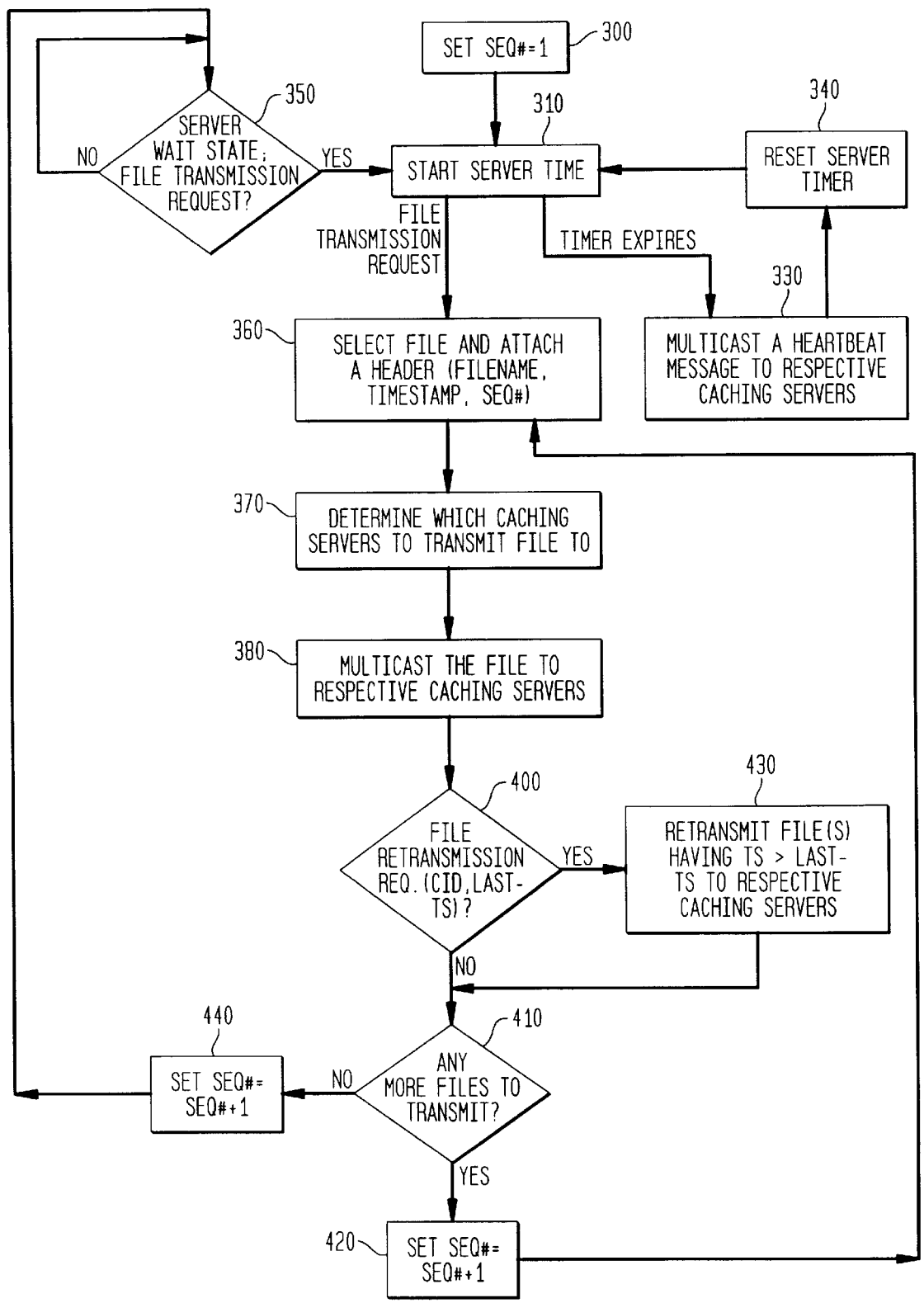
FIG. 3 shows an exemplary embodiment of a server state diagram of the present invention.

FIG. 3 illustrates an exemplary embodiment of a server state diagram of the present invention. A sequence number (Seq#) which may, for example, be stored in a memory of the server is initially set to a sequence number initialization value such as one 300. In an exemplary embodiment of the present invention, a server timer is started 310. The server enters a server wait state waiting for a file transmission request 350. In an exemplary embodiment of the present invention, a heartbeat message is multicast or broadcast to a plurality of caching servers upon expiration of the server timer 330. Further, the server timer is reset each time the heartbeat message is transmitted by the server 340.

Figure 4:
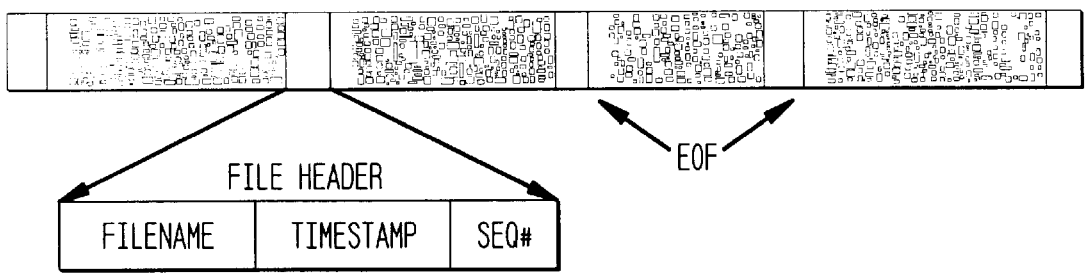
FIG. 4 shows an exemplary embodiment of a header of the present invention.

While in the server wait state 350, upon receiving a file transmission request, the server starts the server timer 310 and selects a file from its file system and the server attaches a header to the file 360. In one exemplary embodiment of the present invention, the file selected will be indicated by the file transmission request. The header may include, for example, a filename, a timestamp, and a sequence number as shown in FIG. 4. The sequence number of the file selected by the server has the value of the sequence number at the time, for example, the file is selected by the server. Thus, the first file selected by the server would have the value of the sequence number at the time of the selection of the file, for example, one. The timestamp may be obtained from an internal system clock of the server. In an exemplary embodiment of the present invention, the server determines to which caching servers to transmit the file 370. In another exemplary embodiment of the present invention, all files get transmitted to all caching servers. In another exemplary embodiment of the present invention, it may be predetermined that certain caching servers would receive certain files. The file and header are transmitted to the respective caching servers by, for example, a transport-level protocol such as RMTP 380. If any of the caching servers did not receive a file that was intended for them to receive, the respective caching servers send a file retransmission request to the server. The file retransmission request may include, for example, an identification of the caching server (Cid) and the last timestamp (Last-TS). The last timestamp includes a timestamp of the last file which has been successfully received by the caching server. If the server determines that a file retransmission request has been received 400, the server will retransmit to the requesting caching servers the respective files having timestamps greater than the last timestamp 430. In an exemplary embodiment of the present invention, the server will invoke a retransmitter to retransmit files to the respective caching services. In one exemplary embodiment of the present invention, the caching servers send to the server information indicative of the size of the file received by the caching servers. The server can determine by conventional means if all the caching servers successfully received the file in its entirety. If not, the server will transmit the portion of the file which was not received by the respective caching servers. When the server determines that there is no file retransmission request 400, the server will determine if more files need to be transmitted to the caching servers 410. If the server determines that more files need to be transmitted, the sequence number is changed 420, for example, by incrementing the sequence number by one, and the server will repeat the file selection and transmission process, that is, go back to the file selection step 360. If the server determines no more files need to be transmitted to the caching servers, in an exemplary embodiment of the present invention, the server changes the sequence number, for example, by incrementing the sequence number by one, and again enters the server wait state waiting for a request to transmit files to the caching servers 350.

In an exemplary embodiment of the present invention, if the server crashes it sets the sequence number to zero and transmits a message to the caching servers indicating that the sequence number is zero. After the server is reset, the server will set its sequence number to the sequence number initialization value (e.g. one).

Figure 5:
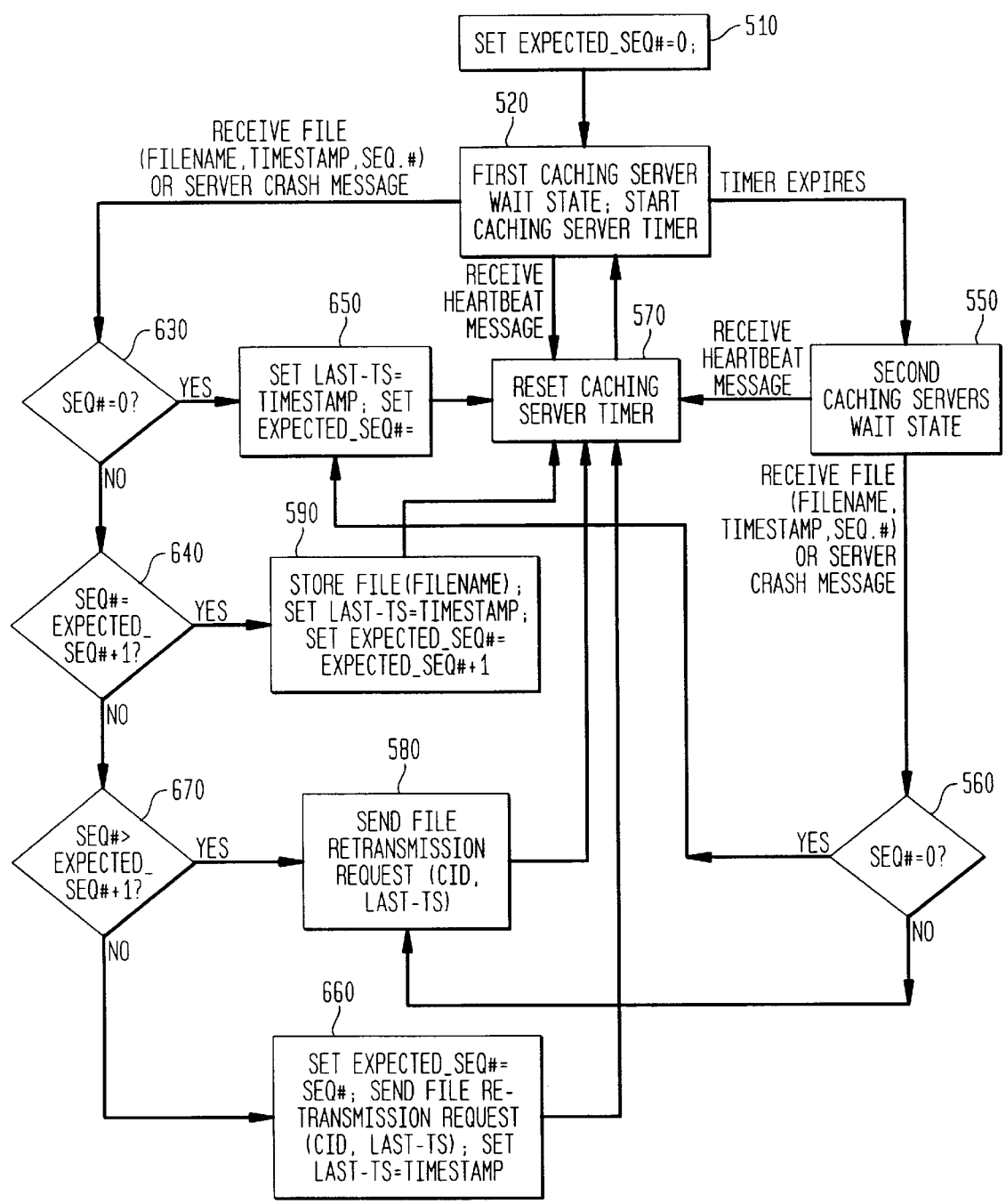
FIG. 5 shows an exemplary embodiment of a caching server state diagram of the present invention.

FIG. 5 illustrates an exemplary embodiment of a caching server state diagram. The caching server includes a caching server timestamp called Last_TS and an expected sequence number (Expected_Seq#). The expected sequence number is initially set to an expected sequence number initialization value such as zero 510. The caching server starts the caching server timer and enters a first caching server wait state 520 waiting to receive from the server a file or a server crash message indicating that the server has crashed. In an exemplary embodiment of the present invention, the server crash message may include the sequence number having a value of zero.

In an exemplary embodiment of the present invention, while in the first caching server wait state, the caching server may either receive a heartbeat message, the caching server timer may exrire, or a file or server crash message may be received. If a heartbeat message is received, the caching server timer is reset 570 and started 520. If the caching server timer expires and the caching server neither receives a heartbeat message nor a file, it enters a second caching server wait state 550. While in the second caching server wait state 550, upon receiving a heartbeat message, the caching server timer is reset 570 and again started. Further, while in the second caching server wait state 550, upon receiving either of the file including a header having the filename, timestamp, and sequence number, as shown in FIG. 4, or the server crash message, the caching server determines if the server crashed 560. In an exemplary embodiment of the present invention, this is determined if the sequence number is equal to zero. If the server has crashed, the last timestamp, Last_TS, is set to the timestamp that the server sent to the caching server in the file header, the expected sequence number is set to the expected sequence number initialization value such as zero 650, the caching server timer is reset, and the caching server again enters the first caching server wait state 520. If it is determined that the server did not crash, however, files have been transmitted by the server but not received by the caching server, the caching server sends the file retransmission request to the server 580, resets the caching server timer 570, and again enters the first caching server wait state 520. In one exemplary embodiment of the present invention, the file retransmission request includes an identification of the caching server (Cid) uniquely identifying the respective caching server and the last timestamp (Last-TS).

While in the first caching server wait state, the caching server determines if it receives a file including a header or server crash message 520. If the caching server receives the file or server crash message, it determines if the server crashed 630. If the server crashed, the last timestamp is set to the timestamp that the server sent to the caching server, the expected sequence number is set to the expected sequence number initialization value such as zero 650, the caching server timer is reset 570, and the caching server again enters the first caching server wait state 520. If the server did not crash, for example, the sequence number is not equal to zero, whether the correct file has been received by the caching server is determined based on the sequence number and expected sequence number 640. In an exemplary embodiment of the present invention, the sequence number is checked to determine whether it equals the expected sequence number plus one 640 which indicates that the correct file has been received by the caching server. If the correct file has been received by the caching server, the file and filename are stored in the caching server, the last timestamp is set to the timestamp indicated in the header of the file stored, the expected sequence number is changed 590, the caching server timer is reset 570, and the caching server again enters the first caching server wait state 520. In an exemplary embodiment of the present invention, the expected sequence number is changed by incrementing it by one.

Accordingly, if the correct file has not been received by the caching server (for example, if the sequence number is not equal to the expected sequence number plus one), the caching server determines if the server has been sending one or more files and the caching server has not been receiving them (for example, the caching server determines if the sequence number is greater than the expected sequence number plus one) 670. This may occur if, for example, the caching server has been partitioned from the network. If so, the caching server sends the file retransmission request to the server 580, the caching server timer is reset 570, and again enters the caching server wait state 520. In an exemplary embodiment of the present invention, the file retransmission request includes the caching server's identification and the last timestamp. Otherwise, for example, if the sequence number is not greater than the expected sequence number plus one, the expected sequence number is set to the sequence number, the file retransmission request is sent to the server including the caching server's identification (Cid) and the last timestamp (Last-TS) is set to the timestamp 660, and the caching server again enters the first caching server wait state 610.

This patent application incorporates herein by reference, in its entirety, U.S. patent application Ser. No. 09/103,976, filed on Jun. 24, 1998, entitled "Push-Pull Services For The Internet".

The embodiments described above are illustrative examples of the present invention and it should not be construed that the present invention is limited to these particular embodiments. Various changes and modifications may be effected by one skilled in the art without departing from the spirit or scope of the invention as defined in the appended claims.

What is claimed is:

1. A method comprising the following steps at a server:
   setting a sequence number to a sequence number initialization value;

entering a server wait state;

upon receiving a file transmission request, selecting a file and attaching a header to the file, the header including a filename, a timestamp, and a sequence number;

transmitting the file to a plurality of caching servers;

determining whether a file retransmission request by a caching server has been received, the file retransmission request including an identification of the caching server and the last timestamp, the last timestamp including a timestamp of the last file which has been successfully received by the caching server;

if the server determines that the file retransmission request has been received, retransmitting to the caching server which sent the file retransmission request files having timestamps greater than the last timestamp;

if the file retransmission request has not been received, determining if more files need to be transmitted to any of the plurality of caching servers;

if no more files need to be transmitted, changing the sequence number, and entering the server wait state; and if more files need to be transmitted, changing the sequence number and performing the step of selecting a file.

2. The method according to claim 1, comprising the following steps:

starting a server timer;

transmitting a heartbeat message to the plurality of caching servers upon expiration of the server timer; and resetting the server timer each time the heartbeat message is transmitted by the server.

3. The method according to claim 1, wherein if the server crashes, the sequence number is set to zero and the server crash message is transmitted to the plurality of caching servers indicating that the sequence number is zero.

4. The method according to claim 1, wherein the server wait state includes waiting for a file transmission request.

5. The method according to claim 1, wherein the timestamp is provided by an internal system clock of the server.

6. The method according to claim 1, wherein the sequence number initialization value is one.

7. The method according to claim 1, wherein changing the sequence number includes incrementing the sequence number by one.

8. The method according to claim 1, further comprising the step of determining to which of the plurality of caching servers to transmit the file.

9. A method comprising the following steps at a caching server:

setting an expected sequence number to an expected sequence number initialization value;

entering a first caching server wait state;

receiving at least one of a file and a server crash message from a server, the file including a header having a filename, a timestamp and a sequence number;

determining if the server has crashed based on at least one of the sequence number of the file and the server crash message;

if the server has crashed, setting a last timestamp to the timestamp, setting the expected sequence number to the initialization value, and entering the first caching server wait state;

if the server has not crashed, determining whether the file was successfully received by the caching server;

if the file was successfully received, storing the file and the filename in the caching server, setting the last timestamp to the timestamp, changing the expected sequence number, and entering the first caching server wait state;

if the file was not successfully received, determining if the file was transmitted by the server and not received by the caching server;

if the file was transmitted by the server and not received by the caching server, sending a file retransmission request to the server and entering the first caching server wait state, the file retransmission request including an identification of the caching server and the last timestamp, the last timestamp including the timestamp of the last file which has been successfully received by the caching server; and otherwise, setting the expected sequence number to the sequence number, sending the file retransmission request, setting the last timestamp to the timestamp, and entering the first caching server wait state.

10. The method according to claim 9, comprising the following steps:

starting a caching server timer;

upon expiration of the caching server timer, entering a second caching server wait state;

if a heartbeat message provided from the server is received, resetting and starting the caching server timer;

upon receiving at least one of the file and the server crash message while in the second caching server wait state, determining if the server crashed;

if so, setting the last timestamp to the timestamp, setting the expected sequence number to the expected sequence number initialization value, and entering the first caching server wait state;

if the server did not crash, sending the file retransmission request to the server and entering the first caching server wait state; and resetting the caching server timer prior to entering the first caching server wait state.

11. The method according to claim 9, wherein the expected sequence number initialization value is zero.

12. The method according to claim 9, wherein the server crash message includes the sequence number equal to zero.

13. The method according to claim 9, wherein determining whether the server has crashed is further based on a value of the sequence number.

14. The method according to claim 9, wherein determining whether the file was successfully transmitted from the server to the caching server is based on the sequence number and the expected sequence number.

15. The method according to claim 9, wherein changing the expected sequence number includes incrementing the expected sequence number by one.

16. The method according to claim 9, wherein the caching server wait state includes waiting to receive at least one of the file and the server crash message from the server.

17. A method for obtaining object-level consistency between a server and at least one caching server, the method comprising the following steps:

tracking by the server of when each one of a plurality of objects is modified last;

associating a last modified field with each of the objects, the last modified field including a timestamp based on the tracking indicating when the respective object was modified last;

maintaining a data structure by the server relating the at least one caching server and the objects delivered to the at least one caching server;

maintaining by the at least one caching server a most recent timestamp corresponding to the objects the at least one caching server received from the server;

sending the most recent timestamp from the at least one caching server to the server when the at least one caching server becomes available;

comparing the last modified field for each of the objects with the most recent timestamp by consulting the data structure; and for each of the objects, if the last modified field is greater than the most recent timestamp, delivering the respective object to the at least one caching server.

* * * * *